US005107253A

United States Patent [19]

Meadows

[11] Patent Number: 5,107,253

[45] Date of Patent: Apr. 21, 1992

[54] STYLUS POSITION DETECTION SYSTEM FOR OPTICAL TOUCH PANEL

[75] Inventor: R. David Meadows, Portland, Oreg.

[73] Assignee: Tektronix, Inc., Beaverton, Oreg.

[21] Appl. No.: 434,745

[22] Filed: Nov. 13, 1989

[51] Int. Cl.[5] .................... G06K 11/06

[52] U.S. Cl. .................... 340/712; 340/706; 178/18; 250/221

[58] Field of Search .................... 340/706, 712; 178/18; 341/26, 31; 250/221, 549

[56] References Cited

U.S. PATENT DOCUMENTS

| | | | |
|---|---|---|---|
| 3,764,813 | 10/1973 | Clement et al. | 250/221 R |
| 3,775,560 | 11/1973 | Ebeling et al. | 178/18 |
| 4,243,879 | 1/1981 | Carroll et al. | 250/221 |
| 4,645,920 | 2/1987 | Carroll et al. | 250/221 |
| 4,684,801 | 8/1987 | Carroll et al. | 250/221 |
| 4,722,259 | 2/1988 | Deutsh et al. | 341/26 |
| 4,766,425 | 8/1988 | Tallman et al. | 341/31 |
| 4,845,346 | 7/1989 | Ouchi et al. | 340/712 |

*Primary Examiner*—Ulysses Weldon
*Assistant Examiner*—Darin Miller
*Attorney, Agent, or Firm*—John D. Winkelman; Paul S. Angello

[57] ABSTRACT

A detection circuit (30, 32) for carrying out a rapid search technique for locating the position of a stylus (12) relative to a display screen (10). A microprocessor (34) and related components select a group of light detectors (20, 28) that are positioned near the display screen (10). The summed output current of the selected group of detectors (20, 28) is monitored to determine whether the output of any detector in the selected group is reduced because of the presence of a stylus (12). Whenever the selected group shows such reduction in output current, that selected groups is divided into two subgroups. The subgroup having reduced current output due to the presence of the stylus (12) is further divided until the particular detector(s) having reduced output current is found, the position of the detector is correlated to the location of the stylus (12) relative to the screen (10).

8 Claims, 4 Drawing Sheets

STYLUS LOCATION REQUESTED
300
SELECT ALL DETECTORS
302
READ $V_D$
304
$V_{DU} = V_{DU}$ FOR ALL DETECTORS
306
$V_D < V_{DU}$ ?
308
NO
YES
DIVIDE SELECTED DETECTORS INTO TWO GROUPS
310
B
SELECT FIRST GROUP
312
READ $V_D$
314
$V_{DU} = V_{DU}$ FOR SELECTED GROUP
316
322
SECOND GROUP = TOUCHED GROUP
NO
$V_D < V_{DU}$ ?
318
YES
320
FIRST GROUP = TOUCHED GROUP
A

B
A
NO
FIRST GROUP = TOUCHED GROUP ?
324
YES
SELECT SECOND GROUP
326
READ $V_D$
328
$V_{DU}$ = $V_{DU}$ FOR SELECTED GROUP
330
338
332
$V_D$ < $V_{DU}$ ?
YES
GO TO STYLUS CENTER ROUTINE
NO
SEND STYLUS CENTER LOCATION COORDINATE TO DISPLAY CONTROLLER
340
END
334
344
NUMBER OF DETECTORS IN TOUCHED GROUP > 1 ?
NO
SEND DETECTOR LOCATION COORDINATE TO DISPLAY CONTROLLER
YES
END
DIVIDE TOUCHED GROUP INTO TWO GROUPS
336

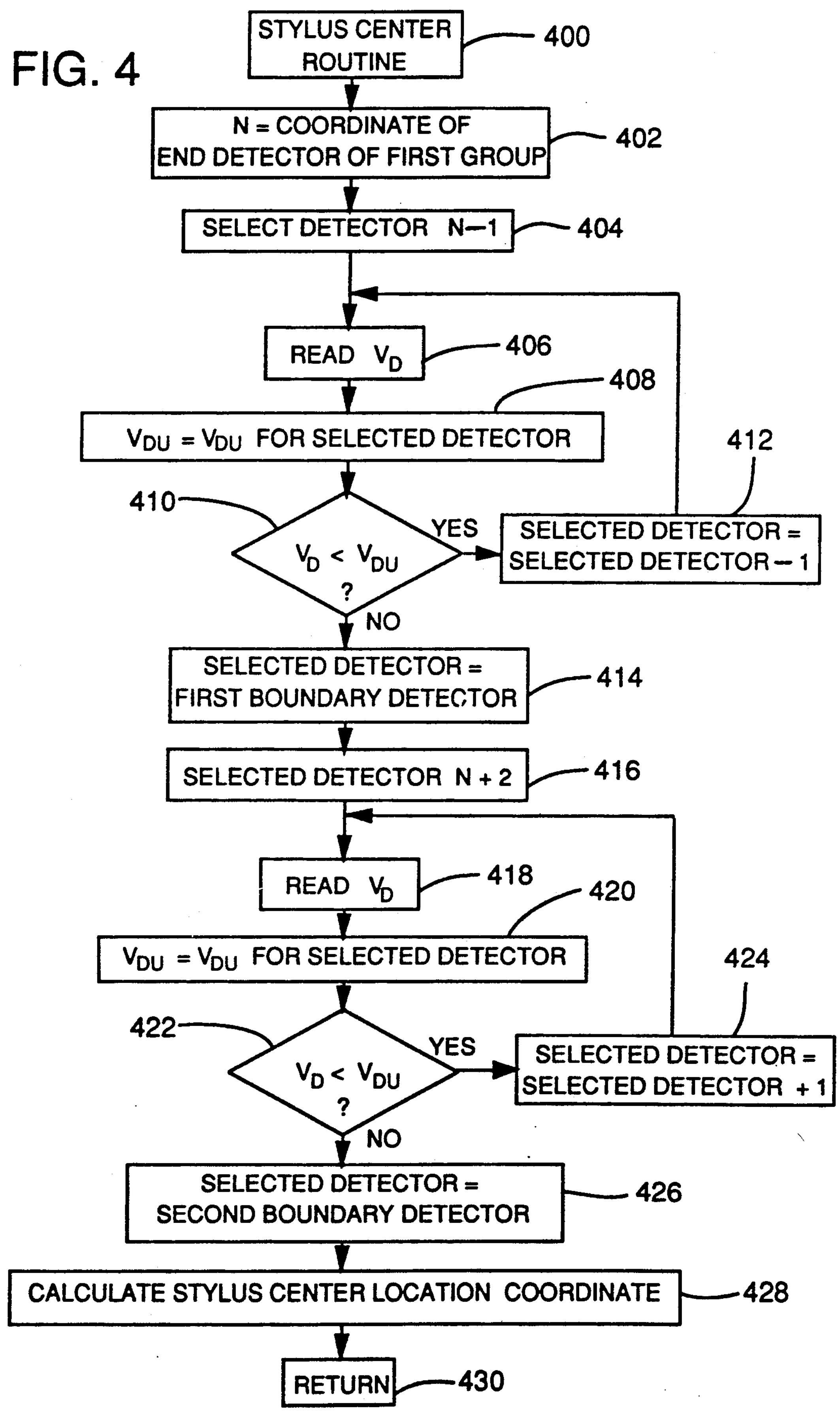
FIG. 4
STYLUS CENTER ROUTINE
400
N = COORDINATE OF END DETECTOR OF FIRST GROUP
402
SELECT DETECTOR N—1
404
READ $V_D$
406
$V_{DU}$ = $V_{DU}$ FOR SELECTED DETECTOR
408
410
$V_D$ < $V_{DU}$ ?
YES
NO
SELECTED DETECTOR = SELECTED DETECTOR — 1
412
SELECTED DETECTOR = FIRST BOUNDARY DETECTOR
414
SELECTED DETECTOR N + 2
416
READ $V_D$
418
$V_{DU}$ = $V_{DU}$ FOR SELECTED DETECTOR
420
422
$V_D$ < $V_{DU}$ ?
YES
NO
SELECTED DETECTOR = SELECTED DETECTOR + 1
424
SELECTED DETECTOR = SECOND BOUNDARY DETECTOR
426
CALCULATE STYLUS CENTER LOCATION COORDINATE
428
RETURN
430

STYLUS POSITION DETECTION SYSTEM FOR OPTICAL TOUCH PANEL

TECHNICAL FIELD

This invention relates to a system for detecting the position of a stylus that is placed near a display screen.

BACKGROUND INFORMATION

Optical touch panel systems have been developed for use as input mechanisms for display devices. Generally, arrays of light emitters and detectors are mounted around the display screen of the display device to establish a plane of light beams passing across and near the display screen. One array of emitters is positioned across the bottom of the screen to extend in an "X" direction. These emitters may be referred to as X emitters. An array of light detectors, referred to as X detectors, is positioned across the top of the screen. Each X emitter is aligned with an X detector.

Another array of light emitters is positioned across one side of the screen to extend in a "Y" direction. These emitters may be referred to as Y emitters. An array of light detectors, referred to as Y detectors, is positioned across the other side of the screen. Each Y emitter is aligned with a Y detector.

Typically, the X emitters and X detectors are sequentially scanned from one side of the display screen to the other. The output signals of the scanned X detectors are monitored to detect an interruption of any X emitter light beam, the interruption indicating the presence of a finger or stylus near the display screen. The Y emitters and Y detectors are also sequentially scanned from the top to the bottom of the display screen. The output signals of the Y detectors are monitored to detect an interruption of any Y emitter beam.

Whenever a stylus is placed near the display screen, data representing the location of the interrupted X emitter beam and of the interrupted Y emitter beam are transmitted to the display device controller. The data represent the X and Y position coordinates of the stylus. The display is changed in a predetermined manner in response to the stylus position data.

To locate a stylus, the sequential scanning technique employed with conventional optical touch panel systems requires an amount of time of the order N, wherein N is the number of light detectors in the detector array having the largest number of detectors. For most applications, it is desirable to minimize the time required to locate the stylus.

SUMMARY OF THE INVENTION

The present invention provides a stylus position detection system for optical touch panels, which system significantly increases the speed with which the stylus position is determined.

The system of the present invention includes components for "searching" an array of light detectors in a manner that is faster than the sequential scanning technique employed with heretofore available systems. More particularly, the present invention comprises a plurality of light detectors mounted near a display screen. The output of each detector is applied to a common output line. Switches are interconnected between each detector and the common output line. Whenever a switch is closed, the detector is considered "selected" and the detector output current is applied to the common output line. Whenever the light directed toward a selected detector is blocked by a stylus, the detector output current is diminished.

A microprocessor is employed to control the opening and closing of the switches in accordance with the search technique of the present invention. More particularly, the microprocessor closes certain switches to define a selected group of detectors. At the beginning of the search, all detectors are selected.

The output current of the selected group of detectors is applied to the common output line and is summed, converted to a digital signal, and provided to the microprocessor. The microprocessor compares this signal with a previously stored value that represents the current signal that would be received by the microprocessor whenever the light reaching the selected group of detectors is uninterrupted by a stylus.

Whenever the comparison shows that the detected signal is less than the stored value for the group of selected detectors, that group is identified as a "touched group." That is, the reduction of the summed output current of the touched group of detectors indicates that the stylus is positioned near the display screen area that is adjacent to the touched group of detectors.

The microprocessor controls the switches to continually divide a touched group and to determine (via the output current signal comparison noted above) which of those divided groups is a touched group. This division process is continued until a touched group comprising only "blocked" detectors is identified. The location of the central blocked detector, which location correlates to the position of the stylus center relative to the display screen, is then provided to the display controller.

It can be appreciated that the system just summarized reduces from an order of N to an order of $\log_2(N)$ the time required for locating a stylus, where N is the maximum number of light detectors in an array of detectors employed with the touch panel system.

As another aspect of this invention, the detection system accomplishes the stylus position detection with an efficient circuit that requires few components.

BRIEF DESCRIPTION OF THE DRAWINGS

FIG. 4 is a flow chart illustrating the procedure carried out by the system in detecting the center of a stylus that blocks two or more detectors.

DETAILED DESCRIPTION OF PREFERRED EMBODIMENT

Figure 1:
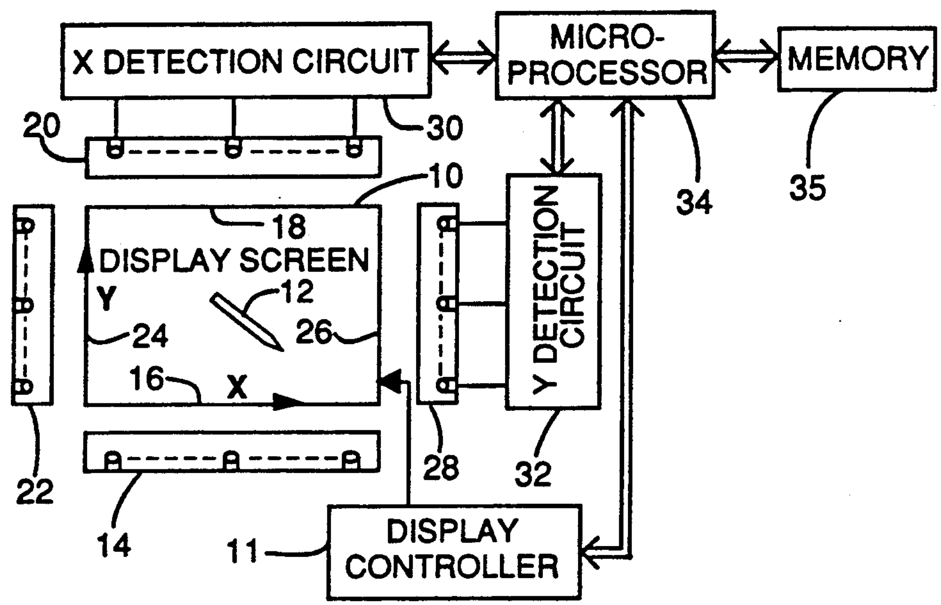
FIG. 1 is a block diagram of the stylus position detection system of the present invention.

With reference to FIG. 1, the system of the present invention is adaptable for use with a display screen 10, such as the video display of a computer terminal. The images displayed are controlled by a conventional display controller 11. Whenever user input is required, the display controller 11 provides the video display with control signals for generating one or more images on the screen. The user places a finger or stylus 12 near a selected image on the screen 10. It is the function of an optical touch panel system to determine the position of the stylus 12 in terms of the X and Y position coordinates of the screen 10, and to provide the position coordinates to the display controller 11 so that the display can be changed in accordance with the input represented by the stylus position.

A light source 14 is mounted along the bottom 16 of the display screen 10. The light source 14 is preferably a linear array of light-emitting diodes. Alternatively, the light source 14 may be a continuous element that produces an undivided beam of light extending across the display screen 10 from the bottom 16 to the top 18 of the screen. The light source 14 is generally parallel to the X axis (the orthogonal X and Y axes are illustrated in the lower left-hand corner of the display screen 10) and is hereafter referred to as the X light source 14.

A linear array of light detectors 20, preferably photodiodes, is mounted along the top 18 of the display screen 10. These detectors 20 are also parallel to the X axis and are hereafter referred to as X detectors 20.

Another light source 22 is mounted along one side 24 of the display screen 10. This light source 22 is, preferably, a linear array of light-emitting diodes. Alternatively, the light source 22 may be a continuous element that produces an undivided beam of light extending across the display screen 10 from one side 24 to the other side 26. The light source 22 is generally parallel to the Y axis and is hereafter referred to as the Y light source 22.

Mounted along the other side 26 of the display screen 10 is another linear array of light detectors 28, preferably photodiodes, that lie parallel to the Y axis and are hereafter referred to as Y detectors 28.

The X detectors 20 are connected to an X detection circuit 30. The Y detectors 28 are connected to a Y detection circuit 32. As described more fully below, the X detection circuit 30 and the Y detection circuit 32 cooperate with a microprocessor 34 and related components to rapidly locate the stylus 12 and to provide the display controller 11 with information representing the position of the stylus 12 relative to the X and Y position coordinates of the screen 10.

Figure 2:
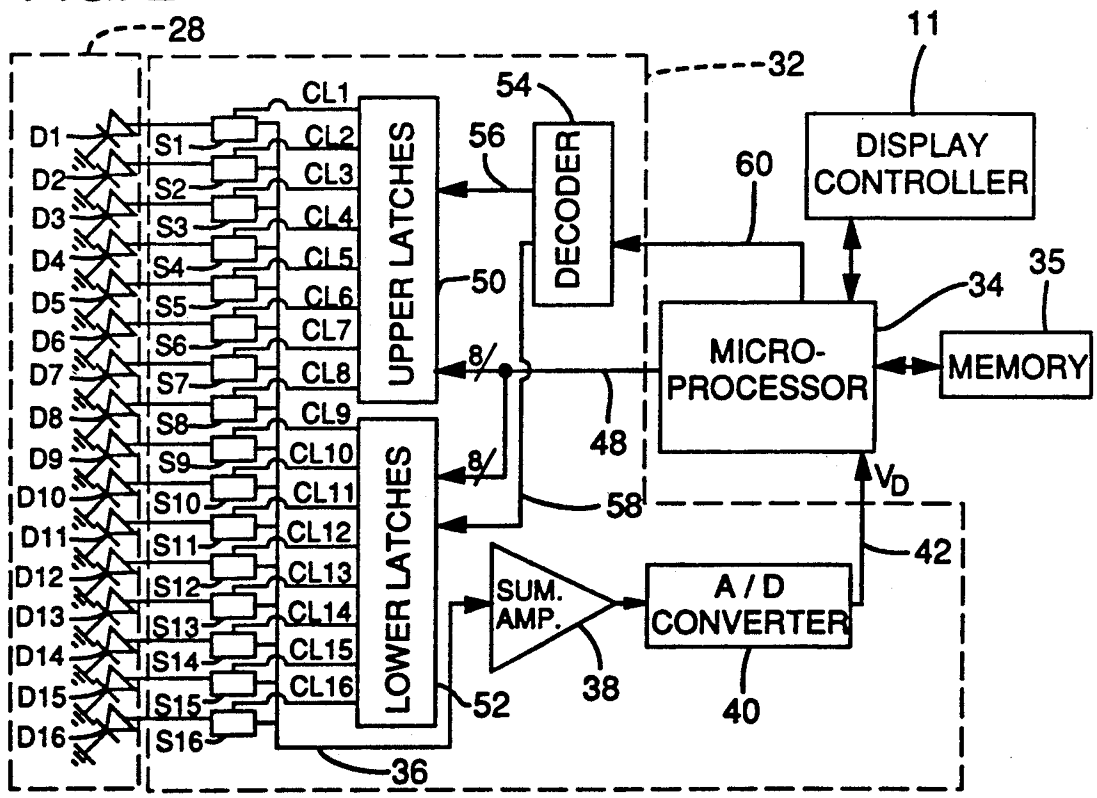
FIG. 2 is a diagram of the detection circuit employed for rapid detection of the stylus position.

More particularly, FIG. 2 illustrates a detection circuit useful for determining the stylus location in accordance with the present invention. For the sake of clarity, only the Y detection circuit 32 is illustrated and described in detail below. Indeed, certain optical touch panel applications may call for detection of a stylus 12 in only one dimension and, therefore, only a single detection circuit would be required. One of ordinary skill in the art will appreciate, however, that the following description of the Y detection circuit 32 will also serve as a description of the corresponding X detection circuit 30.

The detection circuit 32 is connected to the Y detectors 28 mentioned above. Shown in FIG. 2 are sixteen photodiodes that serve as the detectors 28. The detectors 28 are individually labeled D1 through D16. A larger or smaller number of detectors may be employed, depending upon the display screen size and the desired resolution of the touch panel system.

The output signal of each detector D1–D16 is connected to a common output line 36 via an associated switch S1–S16. The switches S1–S16 may be any suitable CMOS analog switches, such as is available from Siliconix, designated DG211.

Whenever one or more of the switches S1–S16 is closed, the output current of the associated detector(s) is applied to the common output line 36 and conducted to a summing amplifier 38. For example, if switches S1–S8 are closed, the output current of each detector D1–D8 is applied to common output line 36. For convenience, any detector associated with a closed switch will be hereafter referred to as a "selected" detector The output voltage of the summing amplifier 38 is proportional to the sum of the output currents of any selected detectors D1–D16. The output voltage of the summing amplifier is converted by a conventional analog-to-digital converter 40 into a digital signal $V_D$, which signal $V_D$ is applied as input to the microprocessor 34 via input line 42. For convenience, the signal $V_D$ is hereafter referred to as a "scan" signal.

The microprocessor 34, such as an 8051 available from Intel, is programmed to control the sequence of the selection of the detectors D1–D16 in a manner described more fully below. Accordingly, at any given time, the microprocessor 34 is apprised of which detectors are selected, i.e., which switches S1–S16 are closed.

Memory 35, which is accessible by the microprocessor 34, includes stored values $V_{DU}$ for individual detectors and for combinations of adjacent detectors, wherein $V_{DU}$ represents the value that would occur on input line 42 whenever light from the Y light source 22 reaches the selected detectors without interruption by a stylus 12. The values $V_{DU}$ for each detector D1–D16 and for the combinations of detectors are written into the memory 35 by the microprocessor 34 during calibration of the system.

To determine whether a stylus has interrupted the light reaching a selected group of detectors, for example, detectors D1–D8, the microprocessor 34 retrieves the stored value $V_{DU}$ for that particular selected group D1–D8 and compares that value $V_{DU}$ with the scan signal value $V_D$ that is received by the microprocessor 34 on input line 42. If the scan signal value $V_D$ falls beneath the stored value $V_{DU}$, a beam interruption is noted. It will be appreciated that the comparison between $V_D$ and $V_{DU}$ may ignore slight variations between the value of $V_D$ and of $V_{DU}$, which variations occur as a result of detector response fluctuations and not as a result of the presence of a stylus 12.

To rapidly locate the precise position of the stylus 12, the microprocessor 34 and related components "search" certain groups of detectors D1–D16 in accordance with a particular technique that is unlike conventional top-to-bottom scanning. In this regard, the size of each selected group of detectors (i.e., the number of detectors in the group) is successively reduced during the search. The search concludes upon finding the particular detector or set of detectors that have diminished output current due to the presence of the stylus 12. Detectors having such diminished output current will be hereafter referred to as "blocked" detectors.

Whenever the detector spacing or stylus diameter is such that more than one detector is blocked by the stylus 12, the search technique employed with the present invention will determine the position coordinate of the central blocked detector, which coordinate corresponds to the center of the stylus 12.

The search technique just mentioned is carried out with a detection circuit that requires few components. Further, as will be clear upon reading this description, the search technique of the present invention is substantially faster than alternative techniques, such as the commonly used sequential scanning of all of the detectors.

The switches S1–S16 are opened and closed via suitable digital Switch Control signals applied on associated control lines CL1–CL16 (FIG. 2). The Switch Control signals are generated by the microprocessor 34 and placed on an eight-conductor bus 48. The bus 48 branches to provide the eight input terminals of eight upper latches 50 and of eight lower latches 52. Eight upper latches 50 are arranged on a single IC chip, such as the 574 Octal D-type manufactured by Texas Instruments. Accordingly, the eight upper latches 50 have a common enable line 56. The eight lower latches 52 are also arranged on a single IC chip and have a common enable line 58.

The upper latches 50 and lower latches 52 are enabled by a "low" (i.e., a low level digital signal) Latch Enable signal that is generated by a decoder 54 and is applied on enable lines 56 and 58, respectively. The decoder 54, such as a LS 138 manufactured by Texas Instruments, generates the appropriate Latch Enable signal in response to a Major Group signal provided on the decoder input line 60 by the microprocessor 34. The Major Group signal is a binary-coded signal indicating which major groups of detectors D1–D16 are to be selected at any particular time during the search. In the preferred embodiment, a major group of detectors is one that is connected, via associated switch control lines, to latches that are combined with a common enable line. Accordingly, as shown in FIG. 2, detectors D1–D8 comprise one major group and detectors D9–D16 comprise another major group. Of course, in instances where more detectors are used, or where IC chips having fewer latches are used, there will be more major groups of detectors.

Figure 3A:
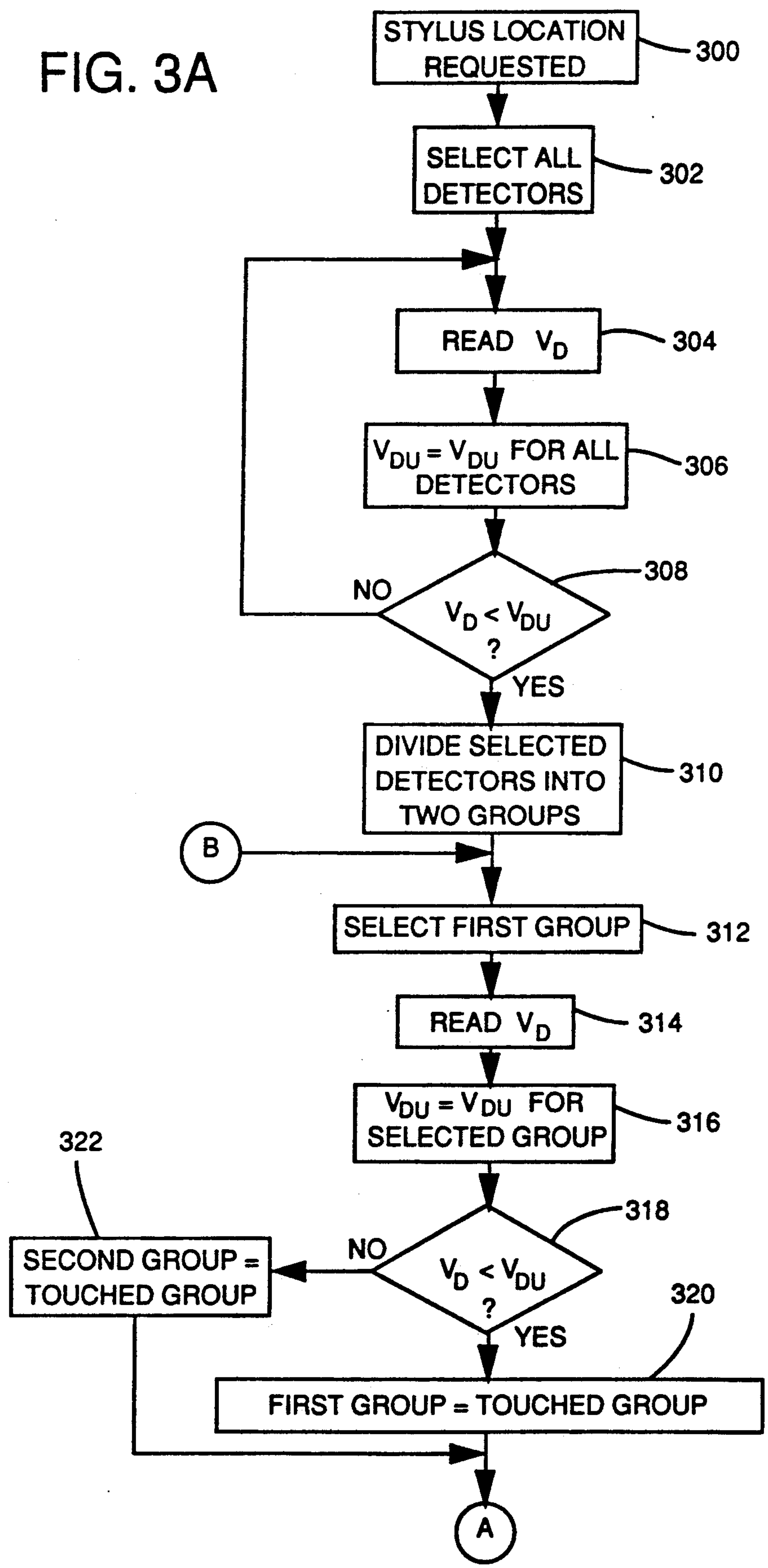
FIGS. 3A and 3B provide a flow chart that illustrates the search technique carried out by the detection system.
Figure 3B:
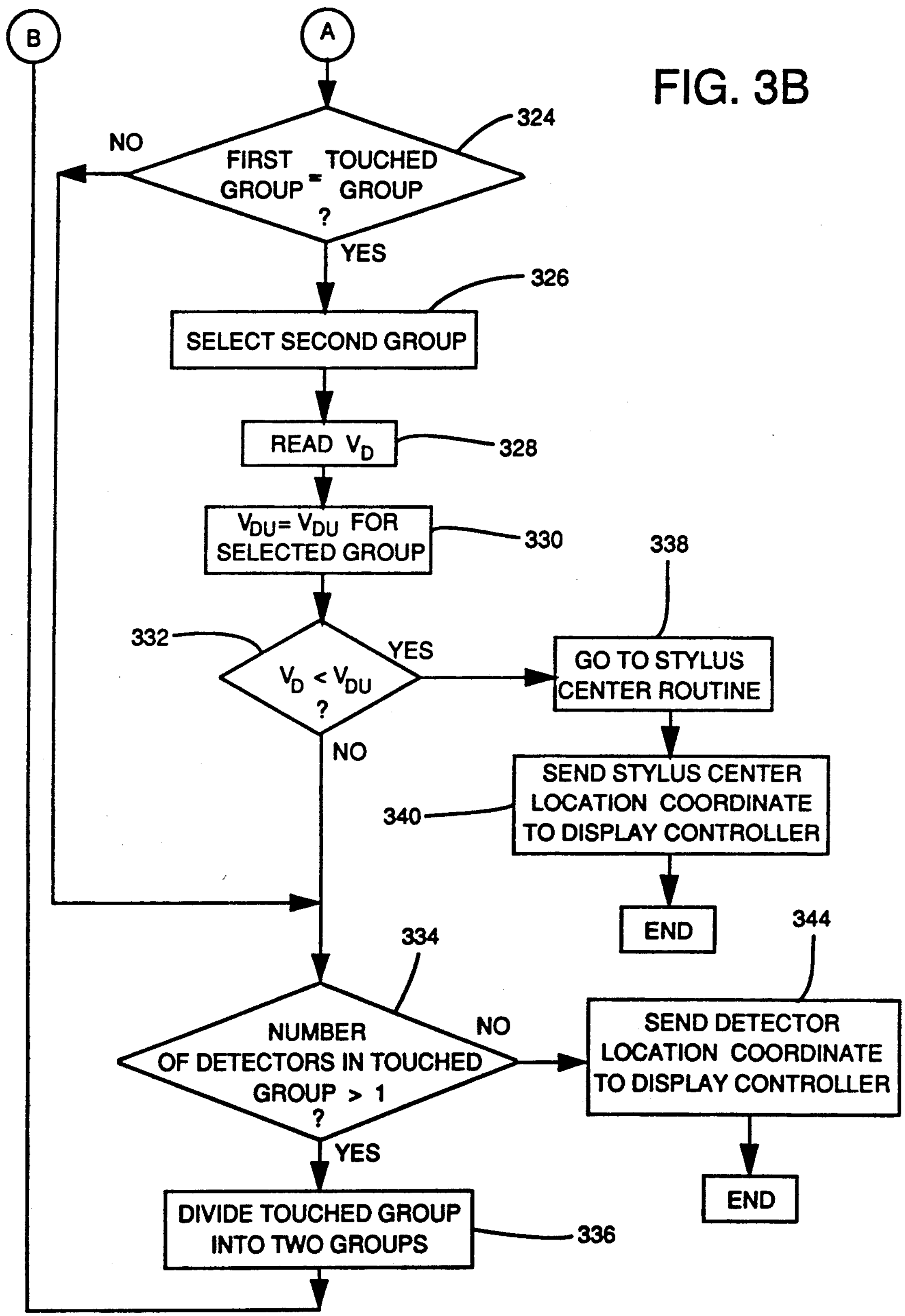

This description now turns to the particulars of the search technique that is carried out using the microprocessor 34 and related components of the detection circuit 32. With reference to FIGS. 2, 3A and 3B, the search technique is initiated whenever the display controller 11 signals the microprocessor 34 that the location of the stylus 12 is required as input for the controller 11 (step 300). The microprocessor 34 responds by producing and applying on decoder input line 60 a Major Group signal indicating selection of all major groups of the detectors, i.e.. the group of detectors D1–D8 and the group of detectors D9–D16 (step 302).

The decoder 54 responds to the Major Group signal by applying a "low" Latch Enable signal on enable lines 56 and 58 to enable the upper latches 50 and lower latches 52. With all latches 50, 52 enabled, the microprocessor 34 places on bus 48 a Switch Control signal for closing the switches S1–S16. Such a signal, for example, would comprise a "low" signal on all eight lines of the bus 48. The Switch Control signal is applied as input to all enabled latches 50, 52 and immediately applied, via control lines CL1–CL16 to close all switches S1–S16.

When all switches S1–S16 are closed (and with light source 22 activated) the microprocessor 34 reads the scan signal $V_D$ occurring on its input line 42 (step 304). As noted earlier, the value of the scan signal $V_D$ represents the sum of the output currents generated by the selected detectors D1–D16. The value $V_D$ is then compared (steps 306, 308)with the previously stored value $V_{DU}$ that represents the output current level for all detectors D1–D16 when no detector is blocked by a stylus 12.

Until the stylus 12 is placed near the display screen 10, the scan signal value $V_D$ will remain substantially equal to $V_{DU}$, thereby indicating no beam interruption has taken place. Consequently, the microprocessor 34 periodically (for example, every one microsecond) rereads the scan signal value $V_D$ on input line 42 and compares that value with $V_{DU}$. Whenever the value $V_D$ falls beneath the value $V_{DU}$, the microprocessor 34 notes the presence of the stylus 12 near the display screen 10.

Upon determining that the stylus 12 is near the screen 10, the microprocessor 34 divides the detectors D1–D16 into two groups (step 310). The microprocessor carries out this division by generating and applying on bus 48 a Switch Control signal for opening all switches S1–S16 (i.e.. a "high" bit on all lines of the bus 48). This Switch Control signal occurs on the output of the enabled latches 50, 52 and is, therefore, applied to open the switches via control lines CL1–CL16.

Next, the microprocessor 34 generates and applies on decoder input line 60 a Major Group control signal that effectively divides the number of major groups of detectors so that only one half of the detectors D1–D8 will be selected (step 312). The decoder 54 responds to the Major Group control signal by applying a "low" Latch Enable signal on line 56 for enabling the upper latches 50, and a "high" Latch Enable signal on line 58. Consequently, the latch output from each of the lower latches 52 to its associated control line CL9–CL16 will remain at a "high" level, and the associated switches S9–S16 will remain open until the lower latches 52 are again enabled.

The enabled upper latches 50 next receive as input a Switch Control signal generated by the microprocessor 34 for the purpose of determining whether the stylus 12 is located within the upper display screen area that is adjacent to the group of detectors D1–D8. Accordingly, the Switch Control signal applied on bus 48 comprises eight "low" bits. The output of each of the enabled upper latches 50 follows the Switch Control signal to apply a "low" signal to each of the control lines CL1–CL8, thereby closing switches S1–S8.

The microprocessor 34 next reads the scan signal value $V_D$ on input line 42, which value represents the sum of the output currents of the group of detectors D1–D8 (step 314). That value $V_D$ is then compared with the stored value $V_{DU}$ that corresponds to the summed output current of the detectors D1–D8 that would be present on line 42 whenever the light source 22 is uninterrupted by a stylus 12 (steps 316, 318). If the comparison shows that $V_D$ is less than $V_{DU}$ (i.e.. indicating the presence of a stylus) the selected group of detectors D1–D8 is designated as a touched group and subject to further division as described below (step 320).

If no stylus is present in the area of the selected group of detectors D1–D8 (it will be assumed for the purposes of this portion of the description that the stylus is positioned to block detector D12), the microprocessor 34 is programmed to assume that the stylus 12 is located in the remaining area of the display screen 10, which area is adjacent to the lower group of detectors D9–D16. Accordingly, detectors D9–D16 will be designated as the touched group (step 322) and further divided to continue the search for the particular blocked detector(s).

Before the touched group of detectors is divided, the microprocessor 34 checks (step 334) to determine whether only one detector remains in that group. If only one detector remains, its position coordinate is sent by the microprocessor 34 to the display controller 11 (step 344). In the present example, more than one detector D9–D16 is in the touched group. Accordingly, the microprocessor 34 proceeds with the division of the touched group as just mentioned (step 336). To this end, the microprocessor 34 first generates on bus 48 a Switch Control signal comprising eight "high" bits. The switch control signal is received as input on the enabled upper latches 50 and immediately transmitted to the Switch Control lines CL1-CL8 to open switches S1-S8.

The microprocessor 34, via a suitable Major Group control signal applied on decoder input line 60, then directs the decoder 54 to apply on line 56 a "high" Latch Enable signal to the upper latches 50 (thereby maintaining the associated switches S1-S8 in the open position until the upper latches 50 are again enabled) and a "low" Latch Enable signal on line 58 to enable the lower latches 52. The microprocessor 34 then applies on bus 48 a Switch Control signal suitable for dividing the detectors D9-D16 (i.e.. the touched group of detectors) into a first group of selected detectors D9-D12 and a second group of non-selected detectors D13-D16 (step 312). Accordingly, "low" bits are applied to the latch inputs corresponding to the switch control lines CL9-CL12, and "high" bits are applied to the latch inputs corresponding to switch control lines CL13-CL16. Accordingly, switches S9-S12 are closed and switches S13-S16 are opened.

The resultant scan signal value $V_D$ occurring on line 42 is then compared with the stored value $V_{DU}$ that corresponds to the summed output of detectors D9-D12 that would be present whenever the light source 22 is uninterrupted by a stylus 12 (steps 314-318). In accordance with the present example, $V_D$ is less than $V_{DU}$ because the stylus is located to block the light input into detector D12. Accordingly, the first selected group of detectors D9-D12 is designated a touched group (step 320).

As mentioned earlier, it is possible that the stylus 12 may block more than one detector. Accordingly, whenever the detectors are divided into two groups, and the scan signal $V_D$ corresponding to the first-selected one of those two groups indicates the presence of a stylus, the scan signal $V_D$ corresponding to the second group of detectors will be sensed by the microprocessor 34 before the first-selected group is further divided (steps 324-332). If the scan signals $V_D$ for both of these groups of detectors indicates the presence of the stylus 12, the microprocessor is apprised that the stylus has been placed near the display screen to extend across the boundary between two groups of detectors. Whenever the stylus is detected as extending across this boundary, the microprocessor 34 calls (step 338) a hereafter-described Stylus Center subroutine (FIG. 4) that rapidly searches the boundary area to locate the particular detector that is blocked by the center of the stylus.

Returning to the present example, before the touched group of detectors D9-D12 is further divided, the microprocessor 34 applies on bus 48 a Switch Control signal that serves to open switches S9-S12 and to close switches S13-S16. The scan signal value $V_D$ occurring on line 42 is then compared with the stored value $V_{DU}$ that corresponds to the summed, uninterrupted, output of the detectors D13-D16 (steps 326-332) In the present example (i.e., with the stylus blocking only one detector D12), the detectors D13-D16 will have no diminution in output current. Accordingly, the microprocessor 34 is apprised that the stylus 12 does not extend across the boundary of the two groups of detectors D9-D12 and D13-D16, and the Stylus Center subroutine is not called.

After the microprocessor 34 determines that the stylus is located solely within the first-selected group, that touched group is divided (step 336) by the microprocessor 34 via a Switch Control signal applied on bus 48. That signal comprises two "low" bits and six "high" bits that, upon transmission to the switch control lines CL9-CL16 via enabled latches 52, opens switches S11-S16 while maintaining switches S9 and S10 in the closed position.

The scan signal value $V_D$ corresponding to the selected detectors D9 and D10 is then read on line 42 and compared with the corresponding stored value $V_{DU}$ for those two detectors D9, D10 (steps 312-318). In accordance with the present example, the scan signal value $V_D$ will not be less than the value $V_{DU}$ because the stylus 12 does not block the light reaching detector D9 or detector D10. Consequently, the microprocessor 34 will designate detectors D11 and D12 as the touched group (step 322) and will apply a suitable Switch Control signal along bus 48 to divide (step 336) that new touched group by closing switch S11 (i.e., selecting detector D11) and opening the remaining switches S9, S10 and S12-S16 (step 312).

As before, the scan signal value $V_D$ for the selected "group" of detectors D11 is compared with the previously stored value $V_{DU}$ for that detector (steps 314-318). In this instance, the value $V_D$ will not be less than $V_{DU}$ and the microprocessor 34, therefore, immediately designates detector D12 as the touched group. Further, because the microprocessor 34 checks the number of detectors in any touched group (step 334), the microprocessor 34 will be apprised that the touched group (i.e.. detector D12) is a final touched group because it comprises only one detector D12. Of course, in applications where it is not necessary for the stylus location to be known relative to a single detector, the microprocessor 34 may be programmed to designate the final touched group when, for example, two or three detectors remain in a touched group.

With the final touched group D12 identified, the microprocessor 34 provides the display controller 11 with the position coordinate Y of the interrupted detector D12.

As indicated above, the stylus 12 may block source light to more than one detector. As discussed with respect to steps 324 through 338 above (FIG. 3B), the microprocessor 34 will learn that two or more detectors are blocked, and will call the Stylus Center subroutine for determining which particular detector is blocked by the center of the stylus 12.

For the purpose of describing the aspect of the search technique directed by the Stylus Center subroutine (step 400, FIG. 4) the example discussed above will be modified to assume the stylus blocks three detectors D12-D14. Accordingly, at step 332 (FIG. 3B) the microprocessor 34 learns that the scan signals $V_D$ corresponding to the first and second groups of detectors D9-D12 and D13-D16 are diminished as a result of the stylus 12 placement across the boundary of those two detector groups. Consequently, the microprocessor 34 calls the Stylus Center routine (step 338).

As illustrated in FIG. 4, the microprocessor 34 is programmed to assign a variable N (step 402) to the coordinate of the detector D12 that is at the end of the touched group of detectors D9-D12, which end is nearest the second detector group D13-D16. Thereafter, the microprocessor 34 successively selects individual detectors on each side of the N detector to locate the two "boundary" detectors that are nearest the N detector and that are not blocked by the stylus 12. It can be appreciated that the center of the stylus 12 is readily correlated to the detector residing midway between these two unblocked detectors.

The search for the two boundary detectors commences with the selection (step 404) of the detector D11 that is adjacent to the N detector. It will be appreciated that the selection of an individual detector involves enabling either the upper latch 50 or lower latch 52 (depending upon which individual detector is to be selected) and then providing on bus 48 a Switch Control signal suitable for closing only the single switch associated with the selected detector.

After the detector D11 that is one detector away from the N detector D12 is selected, the microprocessor 34 reads the associated scan signal $V_D$ on input line 42 and compares that signal with the stored value $V_{DU}$ for that detector D11 (steps 406–410). In accordance with the present example, the detector D11 is unaffected by the stylus 12. Accordingly, the microprocessor 34 designates the selected detector D11 as a First Boundary detector (step 414).

The microprocessor 34, next selects detector 14 (step 414) and, after finding its output diminished by the presence of the stylus 12 (steps 418–422) next selects detector D15 (step 424).

The microprocessor 34 finds (step 422) that detector D15 is unaffected by the stylus 12. Accordingly, that detector D15 is designated as the Second Boundary detector (step 426).

The microprocessor 34 then calculates (step 428) the stylus center location coordinate as the location coordinate of the detector D13 that is midway between the First Boundary detector D11 and the Second Boundary detector D15. The microprocessor then returns to the main program (step 430) and sends the stylus center location coordinate to the display controller 11 (step 340).

It can be appreciated that if only two detectors were blocked by a stylus, the microprocessor 34 would treat one of them as the "central" detector. Alternatively, the microprocessor 34 could compare the scan signals $V_D$ of both blocked detectors and designate the detector having the lower-value scan signal $V_D$ as the central detector.

It can be appreciated that the search technique just described is faster than a technique employing sequential scanning of all of the detectors. More particularly, the time required to sequentially scan N detectors in conventional fashion is of the order N. The present system, which successively divides the N detectors into two groups and proceeds to divide only the touched groups of detectors, reduces the time required to the order $\log_2(N)$. The speed of the present system may be advantageously exploited by either providing the display controller with stylus location information sooner than it can be provided by sequential scanning systems, or by permitting the use of detectors that have relatively slow response times, while still providing the stylus location information at speeds comparable to sequential scanning systems.

While the present invention has been described in relation to a preferred embodiment, it is understood that various alterations, substitutions of equivalents and other changes may be made without departing from the spirit and scope of the invention.

I claim:

1. In an optical touch panel system having a light source for directing light toward plural light detector elements that each generate an analog output signal representing the amount of light received from the light source, an amount of light less than a predetermined threshold representing a selected location on the touch panel, a method for identifying the selected location, comprising:
   - designating a group of the light detectors as a sampling group;
   - forming a summed output signal with a magnitude representing a sum of the amplitudes of the analog output signals generated by the light detector elements in the sampling group;
   - comparing the summed output signal to a reference output signal having a magnitude representing a sum of the amplitudes of the analog output signals generated by the light detector elements in the sampling group when they all receive the light from the light source; and
   - whenever the magnitude of the summed output signal differs from the magnitude of the reference output signal by more than a predetermined signal difference, dividing the sampling group of light detectors into a subgroup and designating it as a sampling group.

2. The method of claim 1 in which the summed output signal is formed as an analog signal.

3. The method of claim 2 in which the reference output signal is in a digital signal format and the summed output signal is converted to the digital signal format for comparison with the reference output signal.

4. The method of claim 1 in which each subgroup divided from a sampling group includes one-half the light detector elements of the sampling group.

5. In an optical touch panel system having a light source for directing light toward plural light detector elements that each generate an analog output signal representing the amount of light received from the light source, an amount of light less than a predetermined threshold representing a selected location on the touch panel, the improvement comprising:
   - summing means for forming a summed output signal with a magnitude representing a sum of the amplitudes of the analog output signals generated by a group of light detector elements designated as a sampling group; and
   - control means for comparing the summed output signal to a reference output signal having a magnitude representing a sum of the amplitudes of the analog output signals generated by the light detector elements in the sampling group when they all receive the light from the light source and, whenever the magnitude of the summed output signal differs from the magnitude of the reference output signal by more than a predetermined signal difference, dividing the sampling group of light detector elements into a subgroup and designating it as a sampling group.

6. The system of claim 5 in which the summing means includes a summing amplifier for forming an analog summed output signal and an analog-to-digital converter for converting the analog summed output signal to a digital summed output signal.

7. The system of claim 6 in which the control means includes a memory circuit for storing the reference output signal.

8. The system of claim 5 in which the control means includes a microprocessor for comparing the summed output signal and the reference output signal.

* * * * *